United States Patent [19]

Lawson

[11] 4,413,972
[45] Nov. 8, 1983

[54] DEVICE FOR USE IN MAKING DOUGHNUTS

[76] Inventor: Richard L. Lawson, 3272 N. Greenwood, Sanger, Calif. 93657

[21] Appl. No.: 341,690

[22] Filed: Jan. 22, 1982

[51] Int. Cl.³ .......................... A21C 5/00; A21C 11/12
[52] U.S. Cl. .................................... 425/290; 222/509; 222/510; 222/518; 425/308
[58] Field of Search .................. 30/301, 316; 222/509, 222/510, 518; 425/287, 288, 290, 296, 308

[56] References Cited

U.S. PATENT DOCUMENTS

| 1,484,179 | 2/1924 | McClure et al. | 425/287 |
| 1,563,376 | 12/1925 | King | 425/287 |
| 2,023,658 | 12/1935 | Ahacich | 425/287 |
| 2,148,774 | 2/1939 | Petzelt | 425/287 |
| 2,637,282 | 5/1953 | Belshaw et al. | 425/287 |
| 2,921,541 | 1/1960 | Belshaw | 425/287 |
| 3,314,382 | 4/1967 | Jones | 425/287 |
| 3,695,802 | 10/1972 | Gilmore | 425/287 |

Primary Examiner—Willard E. Hoag
Attorney, Agent, or Firm—Huebner & Worrel

[57] ABSTRACT

A device for use in making doughnuts or the like having a partition of inverted frusto-conical form provided with a central opening; an inner tubular ring extended downwardly from the partition in circumscribing relation to the opening; an outer tubular ring extending downwardly from the partition in circumscribing relation to the inner ring; a container for dough mounted upwardly on the partition; and a valve head fitted to the opening selectively for opening and closing the opening to deposit dough from the container for cutting by the rings into a doughnut and a plug centrally of the doughnut, the configuration of the respective lower sides of the partition and of the head facilitating release of the doughnut and the plug from the rings.

8 Claims, 2 Drawing Figures

DEVICE FOR USE IN MAKING DOUGHNUTS

BACKGROUND OF THE INVENTION

1. Field of the Invention

The present invention relates to a device for use in making doughnuts or the like, and more particularly to such a device which is hand held and which contains dough, measures out the dough, and cuts doughnuts therefrom.

2. Description of the Prior Art

It is well known to form a doughnut for subsequent cooking by pressing a cutter having a pair of concentric rings into a previously prepared layer of dough, such forming of a doughnut also forming a plug of dough corresponding to the hole of the doughnut centrally of the inner ring.

It is also well known to deposit in a layer a predetermined quantity of batter, corresponding to an individual pancake or the like on a horizontal surface by utilizing a pitcher-like utensil having an opening centrally of its base for passage of batter from the container onto the surface, the utensil being provided with a manually actuatable valve mechanism selectively to control such passage of dough from the container. It is believed novel to combine such a utensil with downwardly extended concentric blade-like rings which serve as a doughnut cutter, a supporting stand and which capture air under pressure when the rings are thrust downwardly into dough to facilitate subsequent ejection of the dough from between the rings.

PRIOR ART STATEMENT

In conformance with 37 C.F.R. Sections 1.97 and 1.98, the applicant states that he is not aware of any prior art, other than that described above, which is, in his opinion, relevant to the patentability of the present invention.

SUMMARY OF THE INVENTION

It is an object of the subject invention to provide an improved device for use in making doughnuts and the like.

Another object is to provide such a device which is manipulatable with one hand and which serves to deposit a layer of dough and, without shifting the grip, serves to cut doughnuts from the layer.

Another object is to provide such a device wherein doughnuts and "holes" cut from the layer are not retained by the device after cutting.

Another object is to provide improved elements and arrangements thereof in such a device which is economical, sturdy, and is fully effective in carrying out its intended purposes.

DESCRIPTION OF THE PREFERRED EMBODIMENT

Figure 1:
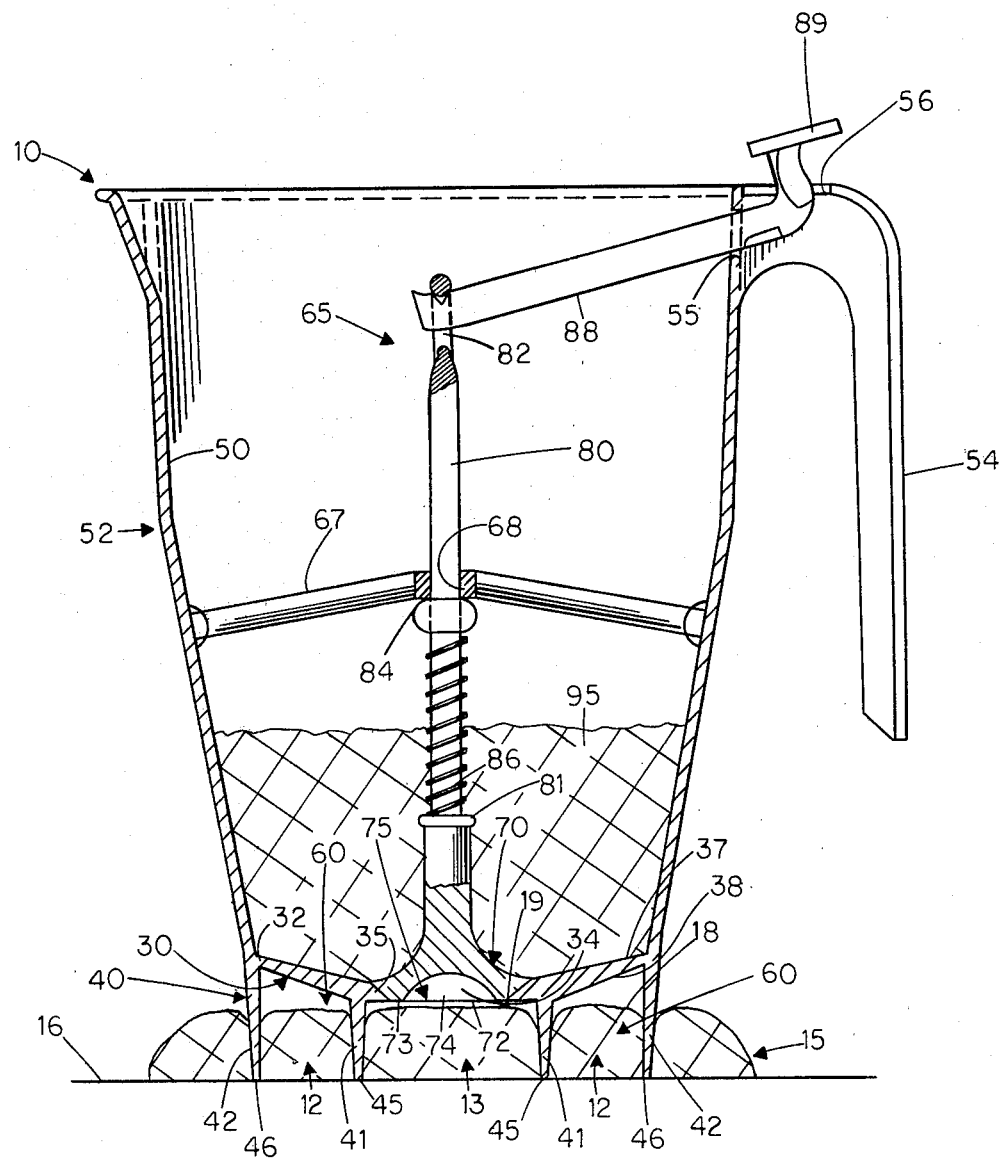
FIG. 1 is a vertical section depicting a device for use in making doughnuts and the like embodying the principles of the present invention, shown cutting dough disposed on a support surface.

Referring with greater particularity to the drawings, the Figures show a device 10 embodying the principles of the present invention. The device is for use in cutting, for subsequent cooking in any suitable manner, a doughnut 12, and a central "hole" or plug of dough 13 from a quantity or blob-like layer 15 of dough. The layer is of predetermined thickness and is deposited by the device on a relatively planar and generally horizontal cutting surface 16. The doughnut and the plug thus have respective upper sides 18 and 19 which are generally parallel to the cutting surface and are spaced therefrom substantially the predetermined thickness of the layer, the doughnut having a predetermined outer diameter and having a predetermined inner diameter which is approximately the outer diameter of the plug.

The device 10 has an annular bottom wall or partition 30 of shallow, inverted frusto-conical form having a larger diameter open end 32 spaced upwardly from a smaller diameter end having a central circular opening 34 circumscribed by an upwardly divergent, relatively narrow, frusto-conical valve seat 35. The opening has substantially the same axis as the partition and lies in a plane normal to such axis, and the diameter of the opening is somewhat less than the diameter of a plug 13. The partition has an upper side 37 which is concave and converges toward the opening and an opposite, lower side 38 which is convex. It is evident that the valve seat is an upper surface of the partition and is included in the upper side thereof.

Downwardly of the frusto-conical partition 30 the device is provided with a cutter, indicated generally by the numeral 40, which has an inner cylindrical blade-like first ring 41 and an outer cylindrical blade-like second ring 42. The inner ring and the outer ring extend downwardly from the partition and terminate in respective individual circular cutting edges 45 and 46. The rings are imperforate and are substantially concentric with the partition and their cutting edges lie in a common plane which is substantially normal to the axis of the partition and is, therefore, parallel to the plane of the opening 34. It is apparent that the cutting edges are disposed oppositely of the rings from the partition so that the partition converges toward this plane. The partition is convergent in a direction along its axis and in a direction from the outer ring toward the inner ring. The inner ring circumscribes the opening 34 and is substantially equal in diameter so the inner diameter of the doughnut 12 so that the ring is only slightly larger in diameter than this opening. The outer ring circumscribes the inner ring and has a diameter substantially equal to the predetermined outer diameter of the doughnut. The inner ring extends downwardly from the smaller diameter end of the partition and has an axial length approximately equal to the predetermined thickness of the layer 15 of dough. The outer ring extends downwardly from the upper end 32 of the partition, the axial length of the outer ring being, therefore, substantially greater than the thickness of the layer of dough.

The device 10 has a generally cylindrical side wall 50 extended upwardly from the upper end 32 of the partition 30. It is evident that the side wall circumscribes the lower end of the partition and that the side wall extends from the partition in a direction oppositely thereof from the cutting edges 45 and 46 and is spaced somewhat in such direction from the outer ring 42 a distance equal to the thickness of the partition. The side wall defines, together with the upper side 37 of the partition, an upwardly open, dough receiving container 52 which is mounted on the partition and is of pitcher-like configuration, having a handle 54. It is evident that the upper side of the partition is disposed toward the side wall and it is apparent that the side wall circumscribes a predetermined volume, which is substantially the volume of the container, and which converges downwardly toward the inner ring 41 and the opening 34. Typically, the handle, the side wall, the partition, and the rings are of unitary construction and are molded from any suitable plastic material. The handle is of known configuration, being joined to the upper end of the container and being of U-shaped cross section opening toward the container. The side wall has a slot 55. This slot is adjacent to the upper end of the container and opens therein inwardly of the handle. The handle has a rectangular opening 56 through it adjacent to the slot.

It is evident that the inner ring 41 and the outer ring 42 define an annular space 60 between them and that the partition 30 extends inwardly of the side wall 50 across the outer ring to the inner ring and closes off this space from the volume of the container 52 which is surrounded by the side wall. It is also evident that the partition extends between the rings and is spaced closer to the plane of their cutting edges 45 and 46 at the inner ring than at the outer ring. Further, the lower side 38 of the partition defines, with the rings, a downwardly open doughnut receiving volume 60 corresponding to the annular space between the rings. It is also evident that a plane extending radially of the rings intersects the lower side of the partition in a line which approaches the cutting edge of the inner ring as this line approaches the axis of the rings.

The device 10 has a valve mechanism, indicated generally by the numeral 65, for controlling the passage of dough from the container 52 through the opening 34. The mechanism includes a bracket 67 extended diametrically across the container and having opposite ends fixed to the side wall. The bracket is spaced a substantial distance upwardly of the opening 34 and has a central bore 68 coaxial therewith.

The valve mechanism 65 includes an imperforate valve head 70 disposed centrally of the inner ring 41 and having a frusto-conical periphery fitted to the valve seat 35 so that the head conforms to the opening 34 and closes the opening when received therein. Since the head and the partition 30 are imperforate, the head closes the lower end of the partition when so received. The head has a lower side 72 having a relatively narrow annular surface 73 which is normal to the axis of the opening and is disposed peripherally of the head. The head has a central concavity 74 which opens downwardly through its lower side toward the rings. Since the head is imperforate, the concavity is closed off from the container 52 when the valve head is received in the opening. The concavity is a section of a sphere and occupies all of the lower side of the head centrally of the annular ring. The concavity is thus disposed centrally of the lower end of the partition 30. The lower side of the head defines, together with the inner ring, a volume or space 75 inside the inner ring for reception of a plug 13 of dough. The concavity, therefore, opens toward this volume and has an area which is a substantial portion of the area of the upper side 19 of such plug.

The valve mechanism 65 also has an elongated cylindrical valve stem 80 slidably fitted to the bore 68 in the bracket 67 and extended upwardly through this bore from the valve head 70 along the axis of the partition 30. The lower end of the stem is rigidly connected to the head and has an annular shoulder 81 adjacent to the head. The upper end of the stem is provided with a slot 82 disposed substantially at the elevation of the slot 55 in the side wall 50. A ball-shaped washer 84 is slidably fitted about the stem in engagement with the bracket, and a helical spring 86 extends between this washer and the shoulder on the stem and resiliently urges the valve head 70 into engagement with the seat 35. A valve lever 88 extends through the side wall slot and pivots thereat on the side wall. One end of the lever extends within the container into the slot in the valve stem and the opposite end of the lever extends from the side wall slot upwardly through the opening 56 in the handle 54 and terminates in a pushbutton 89. It is evident that the valve stem and the lever are a linkage manually actuatable by the pushbutton for selective movement of the valve head upwardly from the seat and for selective movement of the head downwardly toward the seat for reception therein to engage the seat.

OPERATION

The operation of the described embodiment of the present invention is believed to be clearly apparent and is briefly summarized at this point. In using the device 10 to make a doughnut 12, the container 52 is provided with suitable dough, indicated by the numeral 95. The device is then grasped by the handle 54 and is positioned over and adjacent to the surface 16. The pushbutton 89 is then actuated to move the valve head 70 from the seat 35 so that dough is gravitationally removed from the container through the opening 34, passes centrally of the inner ring 41, and is deposited on the surface to form the blob-like layer 15 of predetermined thickness, the blob being formed with a width substantially greater than the diameter of the outer ring 42. When the proper quantity of dough is deposited, the pushbutton is released so that the valve head engages the seat and cuts off the passage of dough. The valve mechanism 65 thus serves selectively for opening and closing the opening 34 to deposit such quantity of dough and to determine the amount of dough in such quantity.

After the layer 15 of dough is formed on the surface 16, the device 10 is moved into the layer toward the surface, in a direction from the container 52 toward the rings 41 and 42 and centrally of the layer, with the cutting edges 45 and 46 generally parallel to the surface. This movement is continued until the cutting edges engage the surface, the relation of the layer and the device then being as shown in FIG. 1. The layer is thereby formed into the doughnut 12, which is disposed between the rings, and into the plug 13, which is disposed centrally within the inner ring. The device is then moved away from the surface 16 and leaves the doughnut and plug thereon for subsequent removal and use as desired. The operation just described can, of course, be repeated to form any desired number of doughnuts and plugs.

As the device 10 is moved from the surface, gravity urges the doughnut 12 and the plug 13 from the partition 30 and the rings 41 and 42. However, as is well known, the dough from which doughnuts are formed has a sticky consistency and adheres to the surfaces of a doughnut cutter contacted by the dough even though such surfaces have a smooth finish and limited area. It will be noted that the volumes 60 and 75 are closed at their upper ends. As the cutter 40 is thrust downwardly into the layer of dough, it initially traps air in the volumes 60 and 75 above the dough. Further, downward movement of the cutter causes the dough to move upwardly therein and to compress the air trapped therein. Once the cutter has formed the doughnut 12 and plug 13, it is normally immediately withdrawn. During the initial withdrawal the entrapped air pressure is greater than the atmospheric air pressure and serves to start the ejection of the doughnut and plug. The more rapidly the dough is poured and cut the less leakage is there of the entrapped air and the more effective is the described ejection of the doughnuts and plugs.

Figure 2:
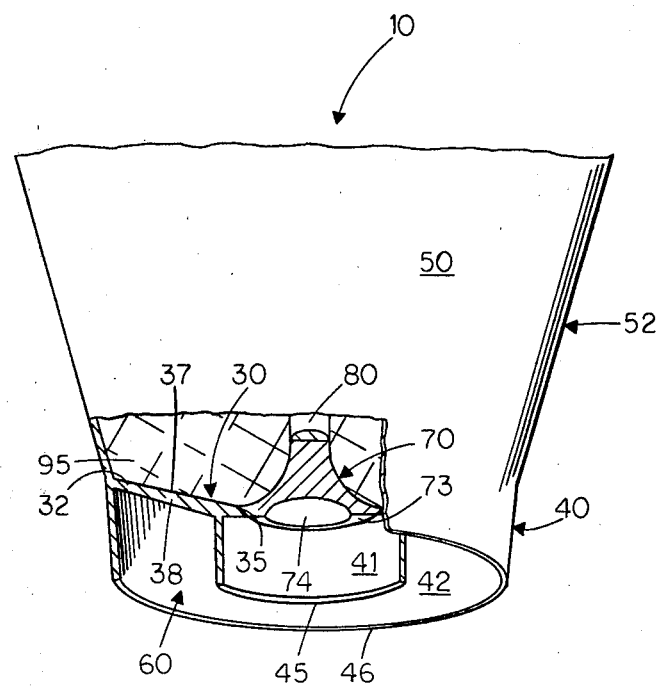
FIG. 2 is a perspective view of the lower portion of the device of FIG. 1 in a retracted position having released the cut dough, portions of the device being broken away to show its interior construction.
Figure 2:
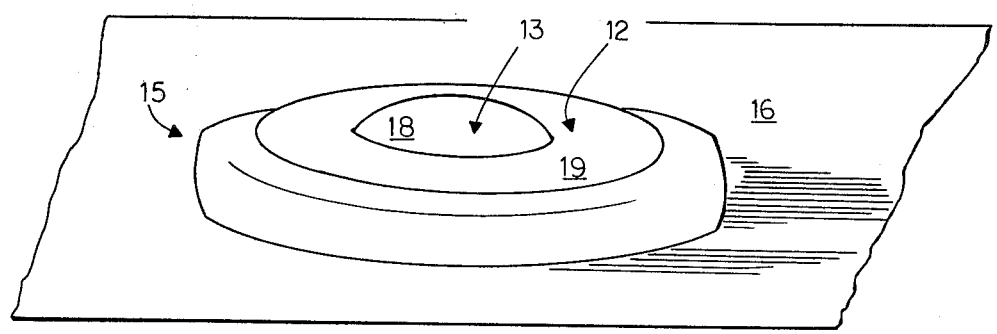

Further, in the device 10 of the present invention, the presence of the concavity 74 in the valve head with its increased capacity for entrapping air facilitates gravitational removal of the plug 13 from within the inner ring 41. Still further, the configuration of the lower side 38 of the partition 30, which is spaced further from the cutting edge 45 of the inner ring than from the cutting edge 46 of the outer ring 42, facilitates gravitational removal of a doughnut 12 from between these rings. As a result, lifting the device 10 from the layer 15 after cutting the doughnut and plug therefrom leaves the doughnut and plug on the surface 16 as shown in FIG. 2. The device of the present invention is thus conveniently and rapidly usable with one hand to deposit a plurality of layers of dough, similar to the layer 15, and immediately to cut each layer into a doughnut and a plug.

While the device of the present invention has been described in terms of the pouring of dough and the cutting of doughnuts, it may be used in the pouring of batter for pancakes, crepes, fritters, waffles, muffins and the like with equal facility.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for use in making doughnuts and the like from a flowable dough disposed on a substantially horizontal upwardly disposed surface comprising a container for such dough having a bottom wall defining an opening centrally thereof; valve means for selectively opening and closing the opening to regulate a gravitational flow of dough therethrough to form a layer of such dough on said surface; a first blade-like ring extended downwardly from the wall in circumscribing relation to the opening; and a second blade-like ring extended downwardly from the wall in circumscribing spaced relation to the first ring, so that pressing the rings into such layer cuts a doughnut therefrom between the rings, said valve means being such as to seat against an upper surface of said bottom wall and leaving unobstructed the space inside said first ring.

2. The combination of claim 1 wherein the rings terminate substantially in a common plane spaced from the container and wherein the bottom wall slopes toward the opening in a direction toward said plane, the wall having one side for funneling dough in the container toward the opening and an opposite side extended between the rings and spaced closer to said plane at the first ring than at the second ring to facilitate removal of the doughnut from between the rings when the device is withdrawn from the dough.

3. A device for use in making doughnuts and the like comprising a container for dough having a bottom wall defining an opening centrally thereof; valve means for selectively opening and closing the opening to regulate the volume of dough permitted to descend therethrough; a first blade-like ring extended downwardly from the wall in circumscribing relation to the opening; and a second blade-like ring extended downwardly from the wall in circumscribing spaced relation to the first ring, so that pressing the rings into dough deposited through the opening forms a doughnut between the rings, the rings terminating substantially in a common plane spaced from the container and the wall sloping toward the opening in a direction toward said plane and having one side for funneling dough in the container toward the opening and an opposite side extended between the rings and spaced closer to said plane at the first ring than at the second ring to facilitate removal of the doughnut from between the rings when the device is withdrawn from the dough subsequent to forming the doughnut, said valve means being such as to seat against an upper surface of said bottom wall leaving unobstructed the space inside said first ring.

4. The device of claim 3 wherein:
A. pressing the device into the dough forms a plug of dough within the first ring;
B. the opening is circular and is substantially concentric with the first ring; and
C. the valve means comprises a head conforming to the opening and selectively receivable therein to close the opening, the head having a cavity defined therein which opens toward the rings and is closed from the container when the head is received in the opening so that the cavity facilitates removal of the plug from within the first ring when the device is withdrawn from the dough.

5. A device for use in making doughnuts or the like, the device being use with a relatively planar, generally horizontal cutting surface, to deposit a layer of dough of predetermined thickness on the surface and to cut from the layer a doughnut having inner and outer diameters and an upper side, the device comprising:
A. an inner cylindrically tubular ring having a cutting end disposed in a plane substantially normal to the axis of the ring, the axial length of the ring being substantially equal to the thickness of the dough and the diameter of the ring being approximately equal to the inner diameter of the doughnut;
B. an outer cylindrically tubular ring disposed in concentric, circumscribing relation to the inner ring and defining an annular space between the rings, the outer ring having a cutting end disposed substantially in said plane, the axial length of the outer ring being substantially greater than said thickness and the diameter of the outer ring being substantially equal to the outer diameter of the doughnut;
C. a side wall extended in a direction from the outer ring axially oppositely of the cutting edge thereof, the side wall being spaced somewhat in said direction from the outer ring and surrounding a predetermined volume;
D. an imperforate partition extending inwardly from the side wall across the outer ring to the inner ring closing off said space therebetween from said predetermined volume, the partition being substantially a portion of a surface of revolution concentric with the rings and convergent in a direction axially thereof from the outer ring toward the inner ring; the partition having one side disposed toward the side wall defining therewith a dough receiving container and having an opposite side disposed toward the rings defining therewith a doughnut receiving volume therebetween; and the intersection with said opposite side of a plane extending radially of the rings being a line which approaches the cutting edge of the inner ring as said line approaches the axis of the rings so that, toward the outer ring, the side of a doughnut received in the doughnut receiving volume is free of said opposite side, facilitating removal of the doughnut from the doughnut receiving volume; and E. valve means disposed centrally of the inner ring selectively for depositing dough from the container to form the layer, said valve means being such as to seat against an upper surface of said one side of the partition leaving unobstructed the volume inside said inner ring.

6. The device of claim 5 wherein the inner ring cuts from the layer of dough a plug centrally of the doughnut as the doughnut is cut from the layer, the plug having an upper side, and wherein the valve means comprises:

A. a circular valve seat defined by such upper surface of the partition and disposed centrally thereof, the valve seat defining a circular opening in the partition for the passage of dough from the container centrally of the inner ring for deposit in said layer, said opening being somewhat smaller in diameter than the inner ring and circumscribed thereby;

B. an imperforate valve head fitted to the seat and engageable therewith to close said opening, the head defining with the inner ring a plug receiving volume centrally of the ring and the head having a side disposed toward said volume and having a concavity opening toward said volume, the area of the concavity being a substantial portion of the area of said upper side, so that such upper side of a plug received in said volume is free of such side of the valve head centrally of the valve head facilitating removal of the plug from said volume; and C. manually actuatable linkage selectively for moving the valve head from the valve seat for such passage of dough and for engaging the head with the seat to cut off each passage.

7. A device for use in making doughnuts or the like comprising:

A. an imperforate, frusto-conical partition having a smaller diameter open end and an opposite larger diameter open end disposed upwardly from the smaller diameter end;

B. an inner cylindrically tubular ring which is concentric with the partition and extends downwardly from said smaller diameter end terminating in a circular lower end which is spaced from said smaller diameter end and which is disposed substantially in a plane normal to the axis of the partition;

C. an outer cylindrically tubular ring which is concentric with the partition and extends downwardly from said larger diameter end in circumscribing relation to the inner ring terminating in a circular lower end disposed substantially in said plane;

D. a container for dough or the like mounted on the partition, the container having a side wall extended upwardly from the partition in circumscribing relation to said smaller diameter end;

E. an imperforate valve head fitted in closing relation to said smaller diameter end, the head having a concavity disposed centrally of said end and opening toward and centrally of the inner ring; and F. means mounting the head on the container for selective upward movement from the smaller diameter end for deposit of dough gravitationally therethrough, the deposited dough being subsequently formed into a doughnut disposed between the rings and into a plug disposed centrally of the inner ring by movement of the rings into the deposited dough, and for selective downward movement of the head toward the smaller diameter end to terminate such deposit of dough.

8. The combination of claim 1 wherein said surface on which the dough is disposed is substantially planar and said layer has a predetermined thickness and wherein the rings terminate substantially in a common plane spaced from the container a distance at least equal to such thickness.

* * * * *